United States Patent
Tistle et al.

(10) Patent No.: US 10,093,198 B2
(45) Date of Patent: Oct. 9, 2018

(54) MAINTAINING A VEHICLE BATTERY

(71) Applicant: Ford Global Technologies, LLC, Dearborn, MI (US)

(72) Inventors: Cathleen Tistle, Manchester, MI (US); Mark Eifert, Frankfurt am Main/Hessen (DE); Christopher Semanson, Durham, NC (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/685,439

(22) Filed: Aug. 24, 2017

(65) Prior Publication Data

US 2018/0037133 A1    Feb. 8, 2018

Related U.S. Application Data

(62) Division of application No. 14/710,936, filed on May 13, 2015, now Pat. No. 9,789,784.

(51) Int. Cl.
*H02J 7/04* (2006.01)
*H02J 7/16* (2006.01)
(Continued)

(52) U.S. Cl.
CPC ....... *B60L 11/1872* (2013.01); *B60L 11/1838* (2013.01); *B60L 11/1861* (2013.01); *H02J 7/045* (2013.01); *H02J 7/047* (2013.01); *B60L 2240/545* (2013.01); *B60L 2240/80* (2013.01); *H01M 10/06* (2013.01); *H01M 10/443* (2013.01); *H01M 10/486* (2013.01); *H01M 2220/20* (2013.01); *Y02E 60/126* (2013.01);

*Y02T 10/7005* (2013.01); *Y02T 10/705* (2013.01); *Y02T 10/7044* (2013.01);
(Continued)

(58) Field of Classification Search
USPC ................ 320/107, 150, 152, 157, 153, 163
See application file for complete search history.

(56) References Cited

U.S. PATENT DOCUMENTS 5,625,272 A    4/1997   Takahashi
5,969,506 A *  10/1999  Neal ....................... H02J 7/022
                                                          307/66
(Continued)

FOREIGN PATENT DOCUMENTS

JP    2013106378 A    5/2013
WO    2014167778 A1   10/2014

*Primary Examiner* — Brian Ngo
(74) *Attorney, Agent, or Firm* — Frank A. MacKenzie; Bejin Bieneman PLC

(57) ABSTRACT

A method is provided for determining a lower voltage set-point, an upper voltage set-point, a temperature-dependent upper current set-point, a time limit value, and a lower current hysteresis threshold set-point based on a measured temperature of a battery. A charge current from a battery charging circuit is provided. If a charge voltage is above the lower voltage set-point and below the upper voltage set-point and the charge current exceeds the temperature-dependent upper current set-point, timer is started. If the timer reaches a time limit value while the charge current exceeds the temperature-dependent upper current set-point and the charge voltage is between the lower voltage set-point and the upper voltage set-point, the charge current is reduced.

7 Claims, 7 Drawing Sheets

(51) Int. Cl.
  *B60L 11/18* (2006.01)
  *H01M 10/06* (2006.01)
  *H01M 10/44* (2006.01)
  *H01M 10/48* (2006.01)

(52) U.S. Cl.
  CPC .......... *Y02T 10/7072* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 6,414,832 B1 * | 7/2002 | Crecelius | H02J 7/1461 361/106 |
| 7,906,937 B2 | 3/2011 | Bhade et al. | |
| 8,274,291 B2 * | 9/2012 | Tsuchiya | G01R 31/3675 320/148 |
| 8,552,693 B2 * | 10/2013 | Paryani | H02J 7/047 320/104 |
| 8,633,678 B2 | 1/2014 | Yegin et al. | |
| 9,356,461 B2 * | 5/2016 | Howard | H02J 7/007 |
| 2006/0220620 A1 * | 10/2006 | Aradachi | H02J 7/0091 320/150 |
| 2011/0215767 A1 * | 9/2011 | Johnson | H02J 7/00 320/136 |
| 2012/0112695 A1 * | 5/2012 | Nishi | B60L 3/0046 320/109 |
| 2013/0063098 A1 * | 3/2013 | Knowlton | H02J 7/0091 320/137 |
| 2013/0181682 A1 * | 7/2013 | Yoshioka | H01G 11/14 320/134 |
| 2014/0070761 A1 * | 3/2014 | Labbe | A61N 1/378 320/108 |
| 2014/0340024 A1 * | 11/2014 | Groat | H02J 7/045 320/107 |
| 2015/0180257 A1 * | 6/2015 | Snyder | H01M 10/441 320/103 |

* cited by examiner

MAINTAINING A VEHICLE BATTERY

CROSS-REFERENCE TO RELATED APPLICATIONS

This application is a divisional of, and claims priority to, U.S. application Ser. No. 14/710,936, titled "Maintaining a Vehicle Battery" and filed on May 13, 2015, the contents of which are hereby incorporated by reference in their entirety.

BACKGROUND

Electric vehicles are becoming more and more prevalent. These vehicles include hybrid vehicles, such as extended range electric vehicles (EREV) that combine a battery and a main power source, such as an internal combustion engine, fuel cell system, etc. EREVs typically employ a high voltage battery and a low voltage battery. The high voltage batteries can be various battery types, such as lithium-ion, nickel metal hydride, lead acid, etc. EREV's low voltage batteries are usually flooded lead acid (FLA) batteries, and usually provide 12.6-15.0 volts for use by on-board computers, entertainment systems, navigation systems, lighting, etc., in a vehicle. An important function of the low voltage battery is to close the contactors of the high voltage bus, which ensures operation of a hybrid vehicle. In other words, if the low voltage battery is depleted, the vehicle will not run. A user expectation of a plugin hybrid vehicle is the ability to plug it in, leave it for some time unattended, and to be able to return later and simply drive off. However, during the time when a vehicle is parked, the low voltage battery provides power to electronic modules to allow them to maintain information (aka memory) and perform other vital vehicle monitoring functions. This key off load can deplete the 12 Volt battery over time. In addition, many vehicles have cellular links to a user's smart phones, which are powered by the low voltage battery that can allow the user to request the status of the vehicle. These loads may deplete the low voltage battery to a point where it will not be able to close the contactors of the high voltage battery.

DETAILED DESCRIPTION

When a hybrid vehicle is plugged in and charging, it is important to maintain an ongoing vigil of the low-voltage battery charging parameters to detect battery charging anomalies or potential battery failures, as disclosed herein. For example, a flooded lead acid (FLA) battery charging and diagnosing system could be continuously running to check for internal shorts and/or low resistance paths which can develop between the battery plates. The disclosed system can also detect and prevent the two most common failure modes of FLA batteries, which are sulfation and excessive gassing, and result from undercharging and overcharging, respectively. The present battery charging and maintenance system may also be in use while the vehicle is driving or when the vehicle is plugged in and left unattended.

Figure 1:
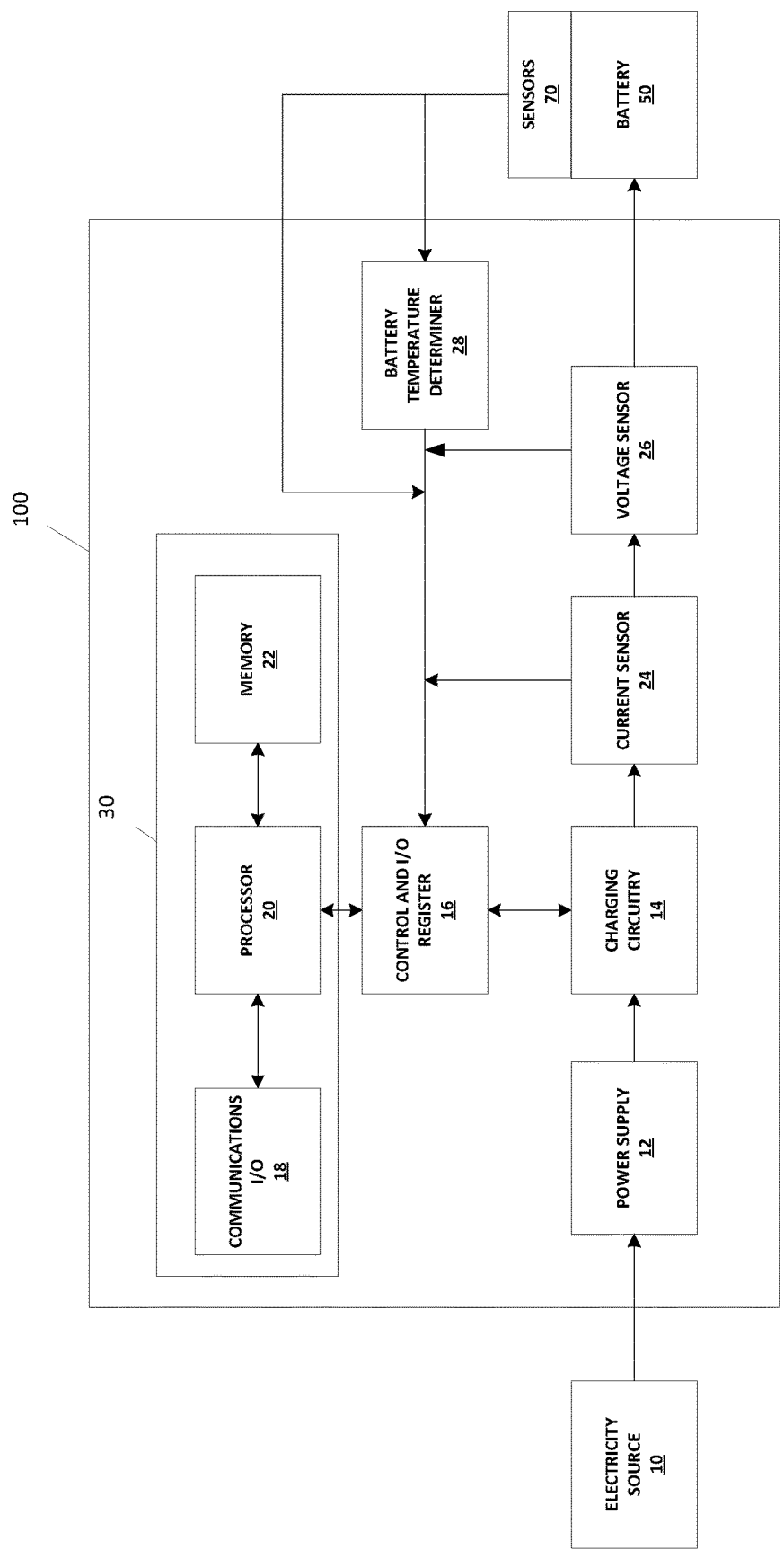
FIG. 1 is a block diagram of an exemplary low voltage battery charging system.

An intelligent battery maintainer for hybrid powered vehicles is therefore provided. FIG. 1 illustrates an exemplary battery maintenance system 100. The system 100 includes a battery 50, which may be a low voltage flooded lead acid (FLA) of a hybrid vehicle (not shown) and a battery sensor array 50. The maintenance system 100 includes an electricity source 10 connected to a power supply module 12. The battery maintenance system 100 further includes a charging circuitry module 14, a current sensor module 24, and a voltage sensor module 26. The system 100 yet further includes a subsystem computer controller 30 which has a processor 20, a communications input/output (I/O) module 18 and a memory 22. The battery maintenance system 100 also includes a control and I/O register 16 module, and a battery temperature determiner circuit module 28.

The electricity source 10 may be an electric grid, such as provided by an electricity provider or a bank of solar cells at a charging station. In the alternative, the electricity source can be provided from the vehicle through a vehicle alternator when the vehicle is running, from the high voltage battery, or from the hybrid vehicle's regenerative braking system. A regenerative braking system, as is known, is an energy recovery mechanism that can operate to slow a vehicle by converting its kinetic energy into another form, such as electric power. The converted kinetic energy can be either used immediately or stored until needed in the battery 50. In conventional braking systems, in contrast, excess kinetic energy is converted to heat by friction in the brake linings and therefore wasted.

The power supply module 12 converts and conditions the voltage received from the electricity source 10 and supplies it to the charging circuitry 14. The power supply module 12 may also supply electricity to power and run the other modules, i.e., a charging circuitry module 14, a current sensor module 24, a voltage sensor module 26, a communications I/O module 18, a control and I/O register module 16, and a battery temperature determiner circuit module 28, as well as supply power to a processor 20 and a memory 22.

The charging circuitry module 14 provides a charging current and a charging voltage for the battery 50. The charging circuitry module 14 is configured by the control and I/O register module 16. The battery 50 charging current and the charging voltage are monitored by the current sensor module 24 and the voltage sensor module 26, respectively. The current sensor module 24 and the voltage sensor module 26 each send charging current and charging voltage measurements to the control and I/O register module 16 for use by a computer controller 30. In other words, the current sensor module 24 and the voltage sensor module 26 monitor a charging current value and a charging voltage value and send the values to the computer controller 30 to determine if any corrective action needs to be taken by the computer controller 30, as discussed in further detail below.

To obtain a measured temperature of the battery 50, as is known, the battery 50 may have the battery management sensor (BMS) 70, such as a temperature sensor embedded therein, and/or an additional sensor, such as a battery cell voltage and temperature sensor (not shown) may be located in or adjacent to the battery 50. The reading from the temperature sensor is sent to the battery temperature determiner module 28. The measured temperature of the battery 50 may also be used in operation of the system 100 to ensure the battery 50 temperature is within an acceptable range. For example, the battery 50 temperature may go above a temperature where the battery 50 may fail.

The battery 50 temperature sensor may include a thermocouple, thermistor, or some other device which provides temperature readings. The battery temperature determiner module 28 will then send the battery temperature to the control and I/O register module 16 for use by the computer controller 30.

A battery monitor sensor (BMS) may also be a system on a chip (SoC) incorporated with the temperature sensor. The SoC is an integrated circuit (IC) that integrates all components of a computer or other electronic system into a single chip. It may contain digital, analog, and mixed-signal functions, such as analog to digital converters, all on a single chip substrate. SoCs are very common in the mobile electronics market because of their low power consumption where they are typically used in applications in the area of embedded systems.

The control and I/O register module 16 is an interface and buffer between the modules and the computer controller 30. The computer controller 30 sets registers in the control and I/O register module 16 to control the charging circuitry module 24. For example, the computer controller 30 determines that an appropriate charge voltage for the battery is 13.8 volts and an appropriate charge current should be 7.5 amps. The computer controller 30 sets the values in the control and I/O register module 16. The values will then program the charging circuitry module 14 to provide the 13.8 volts at 7.5 amps to charge the battery 50.

The communications I/O module 18 may be connected to a human-machine interface (HMI), such as a graphical user interface (GUI) and/or other known HMI, that allows users to interact with battery maintenance system 100 through graphical icons and/or other visual indicators. The communications I/O module 18 may also be connected to a controller area network (CAN) bus. The CAN bus is known to allow microcontrollers and devices to communicate with each other via message-based protocol communications.

The communications I/O module 18 may also be connected to a vehicle's telematics unit to receive status requests and to send notifications to a user. Telematics, as is known, is the use of technology to send, receive and store information via telecommunication devices with regard to various vehicle components such as sensors, instrumentation, wireless network status and communications, road conditions, road safety, etc.

Figure 2:
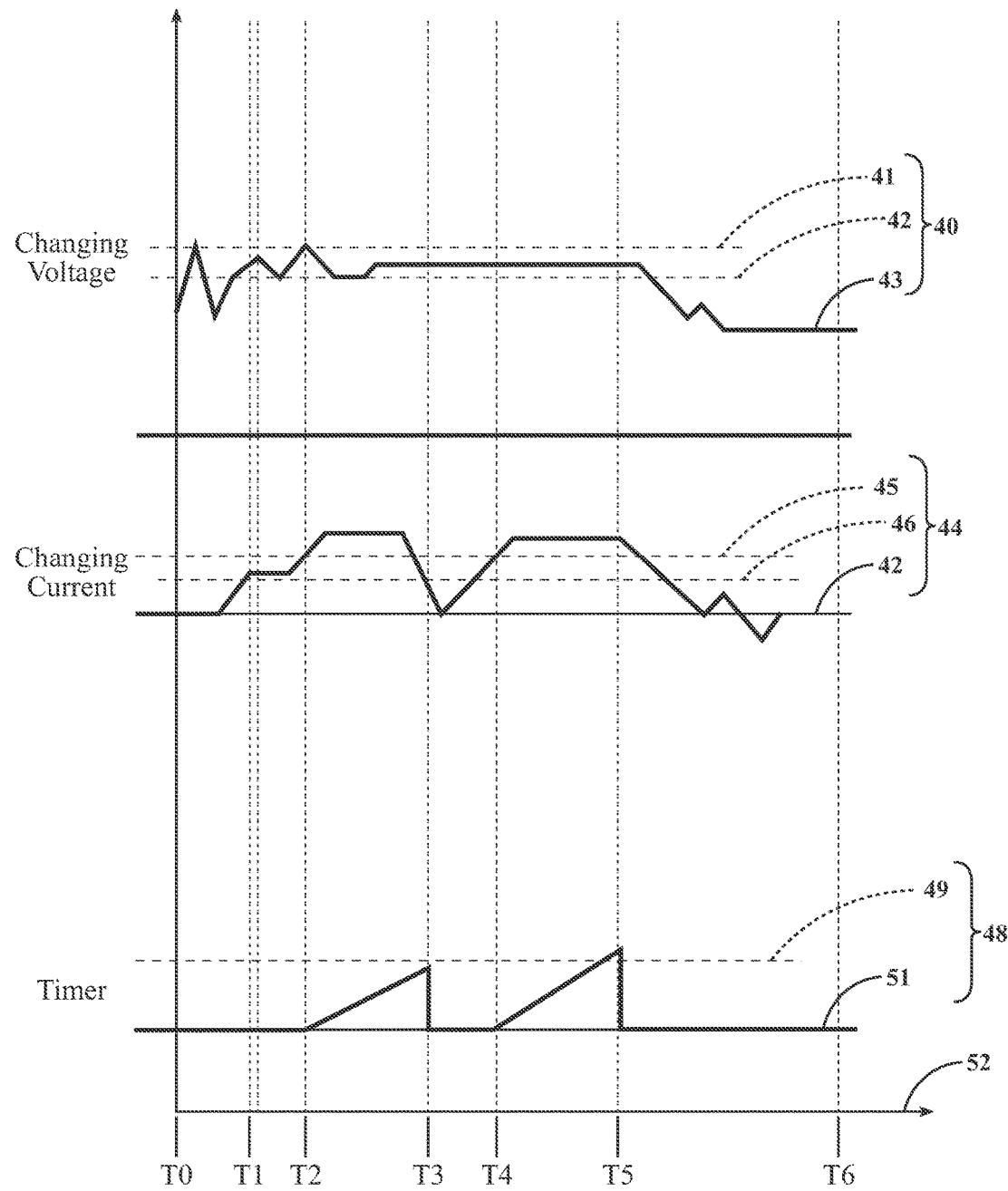
FIG. 2 is a timing diagram of an exemplary low voltage battery charging system.

Now with reference to FIG. 2, which is a timing diagram of an exemplary embodiment with simulated data to explain the operation of the system 100. Once the battery maintenance system 100 is turned on or energized, a temperature of the battery 50 is determined by the battery temperature determiner 28 and sent to the computer controller 30. The computer controller will then determine an upper voltage set-point 41 and a lower voltage set-point 42 appropriate for the temperature.

Next, a temperature-dependent upper current set-point 45 and a lower current hysteresis threshold set-point 46 are determined by the computer controller 30 as shown on the current timing diagram 44 of FIG. 2. A time limit value 49 is also determined by the computer controller 30 as shown on the timer diagram 48 along with a time axis 52, on which time increases as the axis moves to the right.

In startup operation, a charge voltage 43 is transient between T0 and T1 of the time axis 48. Therefore, the T0 to T1 charge voltage 43 measurements are not accurate and are not utilized by the system 100. Between T1 and T2, the charge voltage 43 is in-between the upper voltage set-point 41 and the lower voltage set-point 42, and a charge current 47 is above the lower current hysteresis threshold 46 and below the temperature-dependent upper set-point 45. The system 100 is, between T1 and T2, considered to be in a steady state.

During the time interval T2 to T3, the charge voltage 43 is in-between the upper voltage set-point 41 and the lower voltage set-point 42, but the charge current 47 is above the lower current hysteresis threshold 46 and above the temperature-dependent upper set-point 45. When this combination of conditions occurs, the timer 51 is started. However, during a next time interval T3 to T4, the charge current 47 value reduces below the temperature-dependent upper set-point 45, and the timer 51 resets before it reaches the timer threshold 49, whereupon the system 100 returns to the steady state.

At time T4 to T5, the charge voltage 43 is in-between the upper voltage set-point 41 and the lower voltage set-point 42, but the charge current 47 is above the lower current hysteresis threshold 46, and above the temperature-dependent upper set-point 45. When this combination of conditions occurs, the timer 51 is starts. However, in this state the charge current 47 remains above the temperature-dependent upper set-point 45, and the timer 51 reaches the timer threshold 49, whereupon the controller 30 identifies an error and the controller 30 incrementally reduces the charge current 47 until it is a zero value as shown at the time interval T5 to T6.

Figure 3:
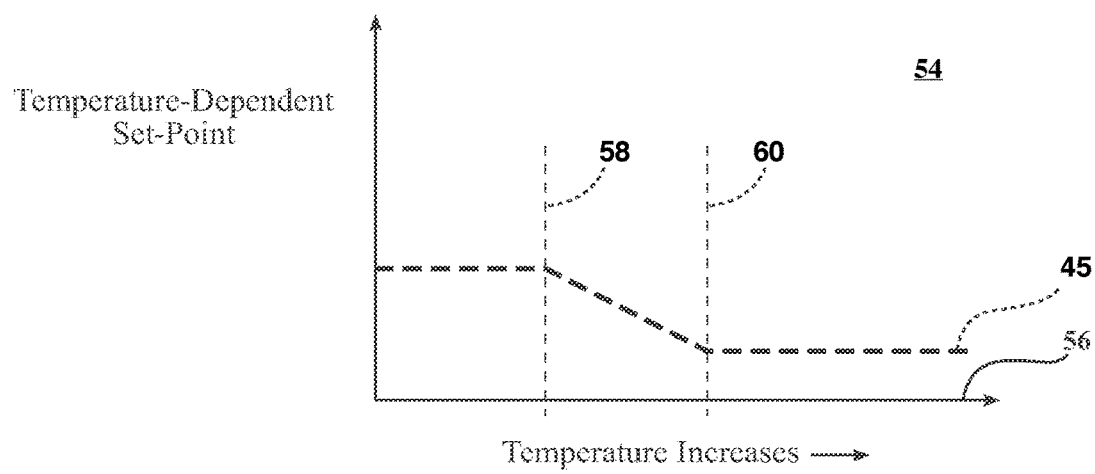
FIG. 3 a plot of an exemplary temperature compensation graph.

In colder temperatures, the battery 50 will need a higher charge voltage 47 as opposed to at a relatively warmer temperature when a lower charge voltage is required to effectively charge the battery due to the effects of heat. FIG. 3 illustrates a plot of an exemplary temperature compensation graph 54 showing adjustment of the temperature-dependent upper set-point 45 for various temperatures. A temperature range 56 is represented on the x-axis of the graph 54. It can be seen that as the temperature increases, the temperature-dependent upper set-point 45 stays flat until a low temperature break point 58, and then the temperature-dependent upper set-point 45 decreases until a high temperature breakpoint 60. As the temperature increases beyond the high temperature breakpoint 60, the temperature-dependent upper set-point 45 returns to being flat.

Figure 4:
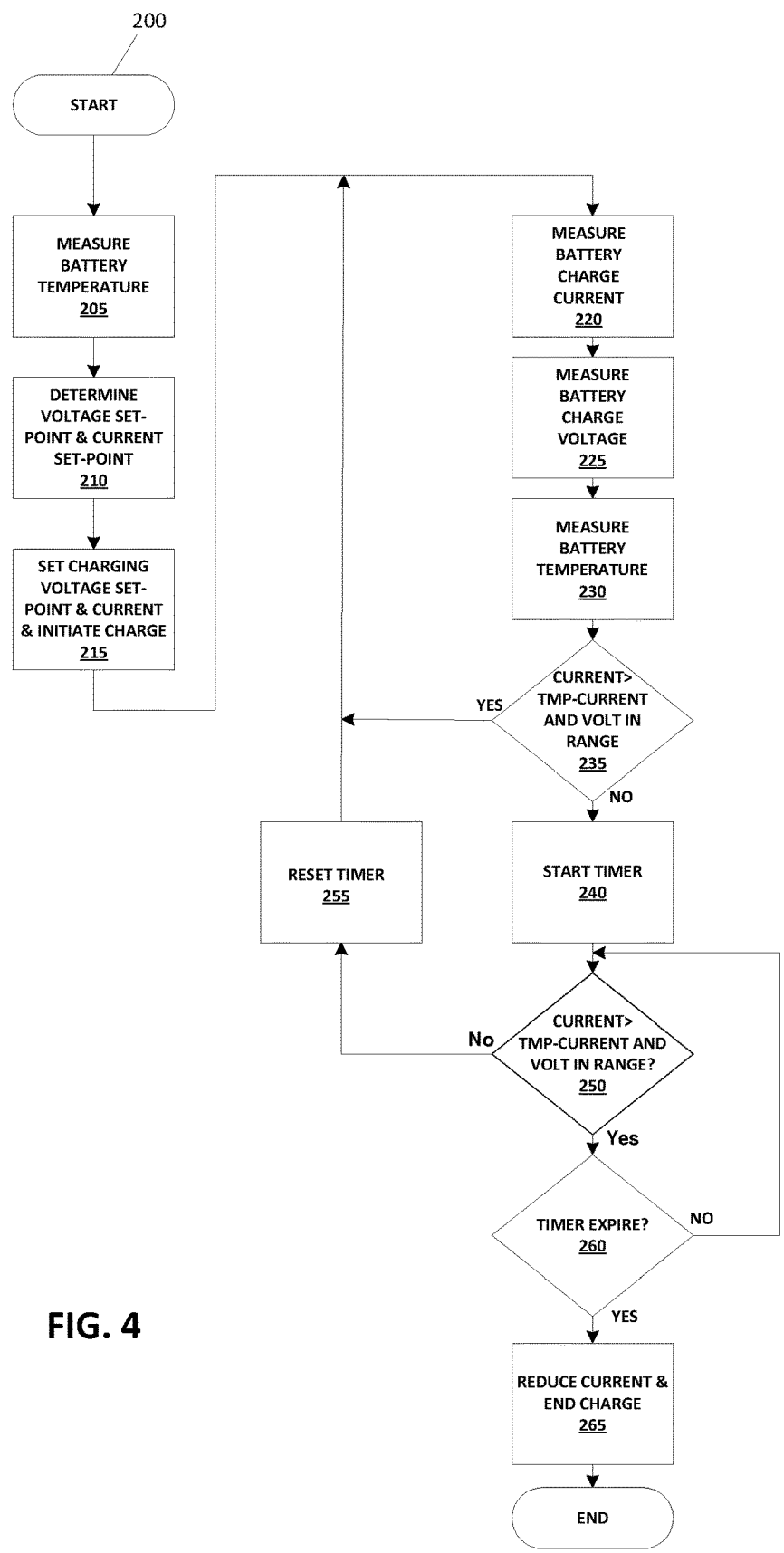
FIG. 4 is a process flow diagram illustrating an exemplary process for the system of FIG. 1.

FIG. 4 is a process flow diagram illustrating program instructions in the controller 30 of the system 200.

The process begins in a block 205, in which the battery temperature is obtained. The computer controller 30, as discussed above, will then determine the upper voltage set-point 41, the lower voltage set-point 42, the charge current 47, and a time 51 value in a block 210. The computer controller 30 will then set the charging circuitry 14 with the charge current 47 value in a block 215.

Next, in a block 220 the charge current 47 will be measured along with the charge voltage 43 in a block 225. Next, in a block 230, another temperature measurement of the battery temperature is taken. If the charge voltage 43 is in-between the upper voltage set-point 41 and the lower voltage set-point 42 and the charge current 47 is above the lower current hysteresis threshold 46 and below the temperature-dependent upper set-point 45 in a block 235, then the block 220 is executed next. If the charge voltage 43 is in-between the upper voltage set-point 41 and the lower voltage set-point 42 and the charge current 47 is above the lower current hysteresis threshold 46 and also above the temperature-dependent upper set-point 45, a timer is started in a block 240.

Following the block 240, if the charge current 47 is below the temperature-dependent upper set-point 45 in a block 250, the timer 51 is reset in a block 255, and a block 220 is executed next. Else, block 260 is executed and a determination is made whether the timer 51 has expired. If the timer 51 did not expire, then block 250 is executed following the block 260. If the timer 51 did expire, then the block 265 is executed and the charge current 47 is reduced until the charge current 47 has a zero value. The process 200 ends following the block 265.

Figure 5A:
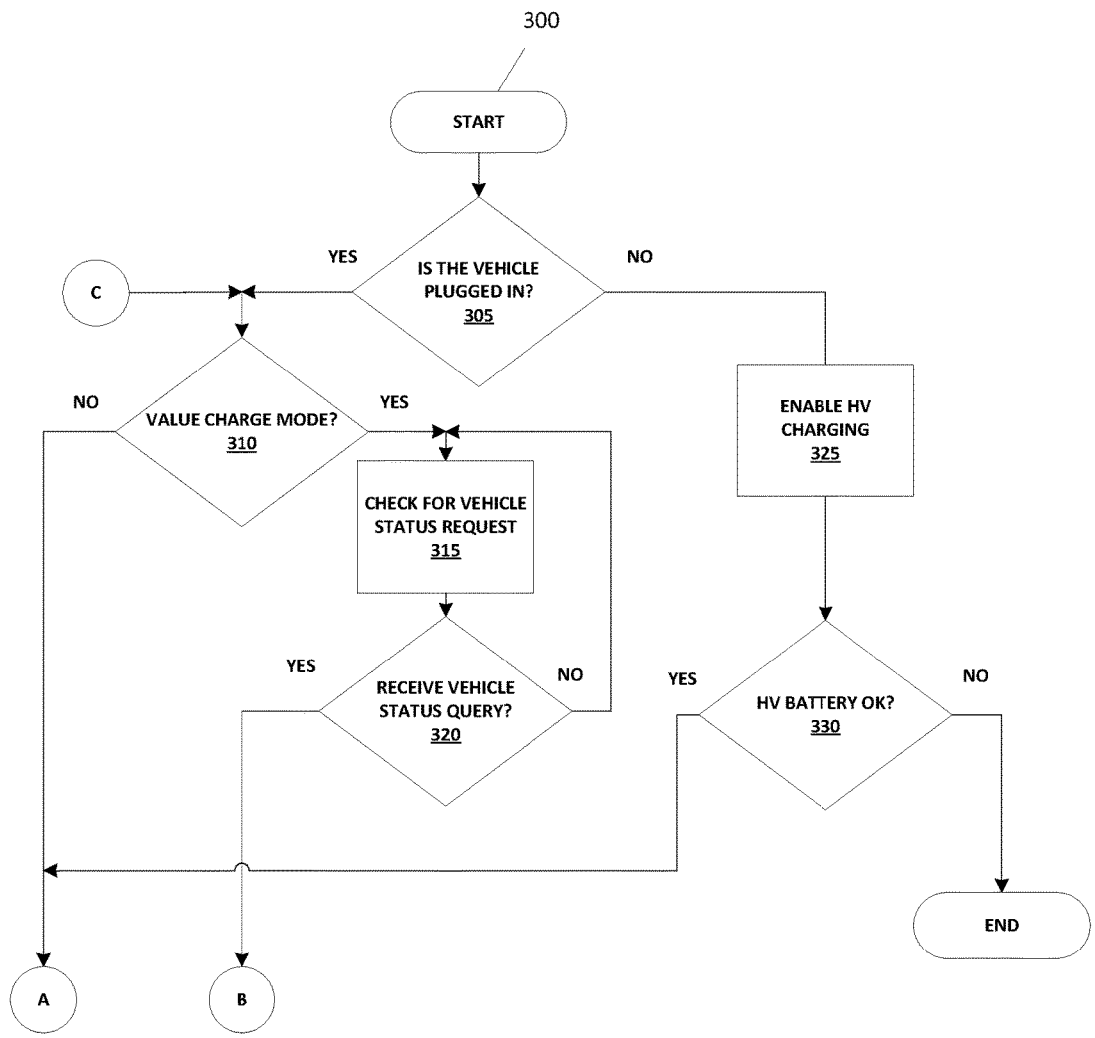
FIGS. 5A-5C are process flow diagrams illustrating another exemplary process for the system of FIG. 1.
Figure 5B:
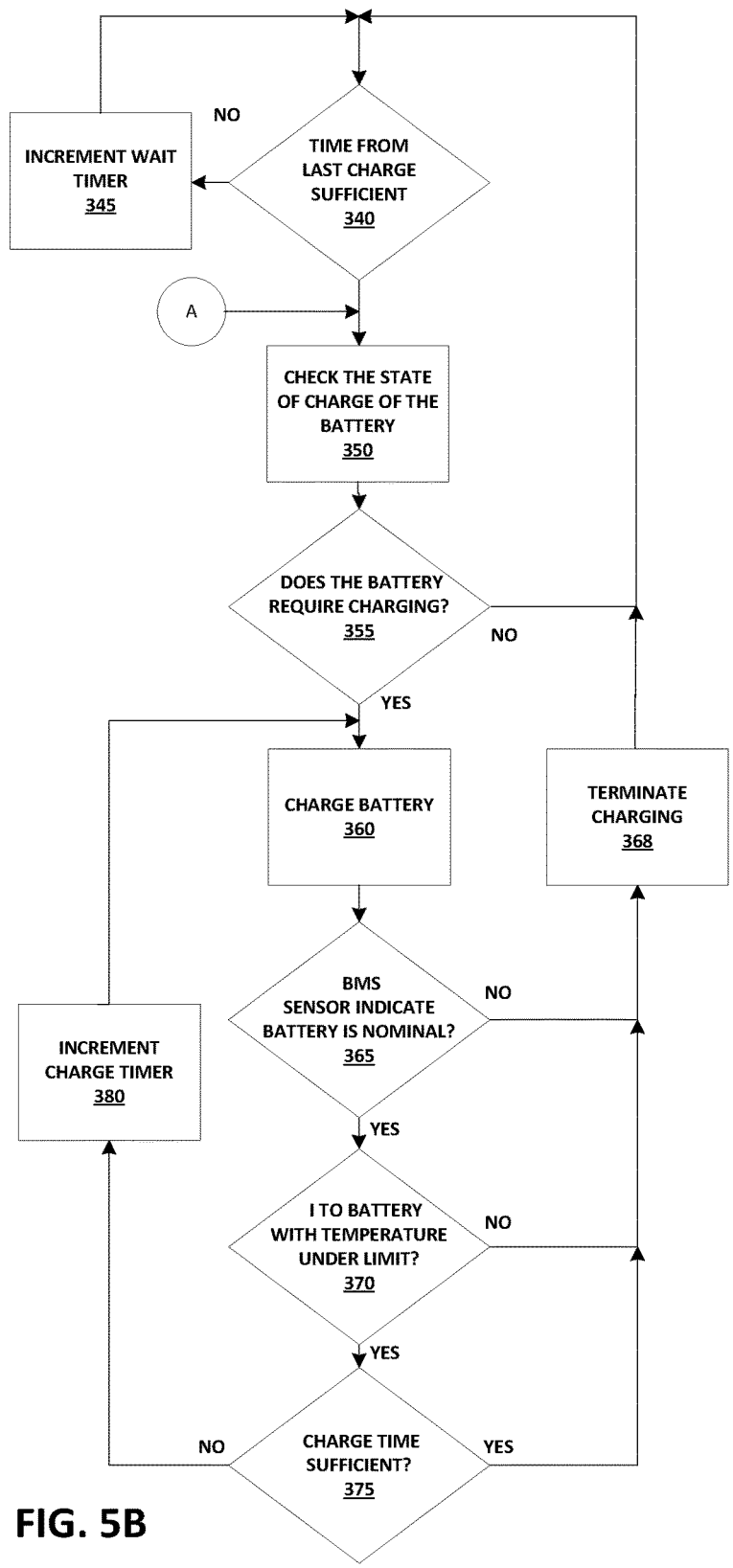
Figure 5C:
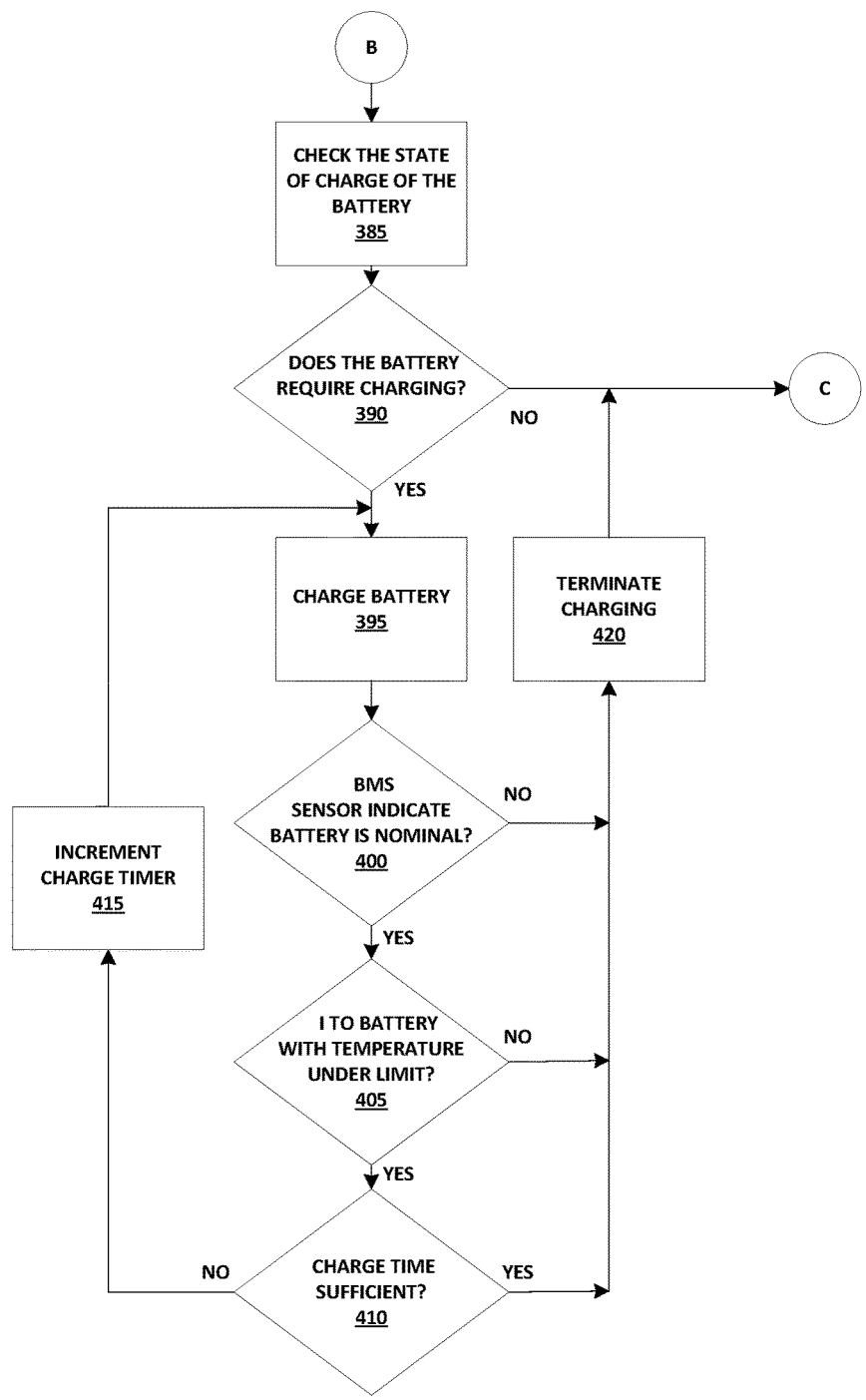

FIGS. 5A-5C are process flow diagrams according to program instructions in the controller 30 of the process 300.

The process 300 begins in a block 305, in which a determination is made of the vehicle's plug status. If the vehicle is plugged in to the electric grid, a second determination is made as to whether the process 300 is in a value charge mode in a block 310. If the vehicle is determined not to be connected to the electric grid in the block 305, then in a block 325 the High Voltage (HV) charging is enabled so that the system 100 uses the vehicle's HV battery as the source for charging the low voltage battery 50. A check of the condition of the HV battery is performed in a block 330. If the HV battery's status is good, the system will proceed to the block 350. An HV battery's status is considered good when all, if not most of the HV battery's blades are holding their charge and the blade's battery cells are not shorted to each other or to the HV battery's enclosure. A blade is a sub-section of a HV battery and may hold 2 or more individual battery cells. If the HV battery status is not good, the process 300 ends following the block 330.

When the cost of the power from the electric grid is expensive, as it can be during peak usage hours, the controller 30 can be configured to run in a value charge mode. In this mode, the system will only check and charge the battery 50 when a status request is made of the controller 30. Therefore, if the value charging mode is enabled, then a block 315 is executed next when the controller 30 determines that an external status request was received. For example, a smartphone or the like may request a status of the vehicle's battery, which awakens the vehicle CAN bus, which in turn draws current from the low voltage battery to service the status request. Next, in a block 320, if the status request was not received, the process 300 will loop back to the block 315. In essence, the system 100 waits for a status request before initiating a charge cycle. When a status request (or query) is received in the block 320, then the process 300 proceeds to a block 385, discussed below.

If the process 300 is in value charge mode in the block 310, the battery 50 status is determined from the BMS 70 in a block 350. Next, in a block 355, the controller 30 will make a determination if the battery 50 needs charging by checking the battery voltage. If the battery 50 does not need charging, then a block 340 is executed next. Otherwise, a block 360 is executed next.

In the block 340, the controller 30 determines if the time from the last charge has reached a charge-between time value. The charge-between time parameter may be supplied by the battery 50 manufacture, by a user, or determined by the controller 30. If the charge-between time was not reached, a timer is incremented in a block 345 and the process 300 returns to the block 340. For example, the system may programmed to wait 4 hours between checking for the charge status of the battery 50. If the charge-between time is reached by the timer, then a block 350 is executed next.

If the controller 30 determines in the block 355 that the battery 50 requires charging, the process of applying the charging current to the battery 50 begins in the block 360. Next, in a block 365, the controller 30 determines the status of the BMS 70. If the controller 30 determines the battery 50 currents, voltages and temperatures are within normal parameters, the process 300 continues in a block 370. If the battery 50 currents, voltages and temperatures are not within normal parameters, then a block 368 is executed next, and whereupon the controller 30 causes charging of the battery 50 to cease. Then the block 340 is executed.

In the block 370, the controller 30 determines whether the current flow to the battery 50 is within an acceptable range, e.g., as inferred by temperature. If so, e.g., if the charging current is below the temperature-dependent upper set-point 45, then a block 375 is executed next. However, if current flow is not within an acceptable range, e.g., the charging current is above the temperature-dependent upper set-point, then the block 368 is executed next, wherein battery 50 charging is ended, and the block 340 is executed next.

In the block 375, the controller 30 determines if the charging time for the battery 50 is sufficient, and if so, then a block 368 is executed next, terminating charging of the battery 50. The charging time may be supplied by the battery 50 manufacture or a user or determined by the controller 30. Then the block 340 is executed. However, if the controller 30 determines the charge time of the battery 50 is not sufficient, the controller 30 increments the charge timer in a block 380 and then the block 360 is executed next.

If the controller 30 receives a status query in the block 320, described above, then a block 385 is then executed next. In the block 385, the controller 30 determines whether the battery 50 needs charging. If the battery 50 needs charging, a determination is made at in the block 390 to continue to the block 395 to initiate battery 50 charging. If the battery 50 does not need charging, then the process 300 returns to the block 310.

After charging the battery 50 begins in the block 395, the controller 30 determines the status of the BMS 70. If the controller determines the battery 50 currents, voltages and temperatures are within normal parameters, the process 300 continues in a block 400. If the battery 50 currents, voltages and temperatures are not within normal parameters, the block 368 is then executed next, and whereupon the controller 30 causes charging of the battery 50 to cease. The block 340 then is executed.

The process 300 continues in a block 405. If the battery 50 status is not nominal, then a block 340 is executed next, and the charging is terminated in a block 420 and then the block 310 is executed next.

In the block 405, the current flow to the battery 50 is determined, and an evaluation is performed concerning whether the current flow is within an acceptable range. For example, the charging current is below the temperature-dependent upper set-point 45, then a block 410 is executed next. If the charging current is above the temperature-dependent upper set-point, the then a block 420 is executed next and the. battery 50 charging is terminated, and the block 310 is executed next.

In the block 410, the controller 30 determines if the charging time for the battery 50 is sufficient, and if so, then a block 420 is executed next, terminating charging of the battery 50. As discussed above, the charging time may be supplied by the battery 50 manufacture or the user or determined by the controller 30. Then the block 310 is executed. However, if the controller 30 determines the charge time of the battery 50 is not sufficient, the controller 30 increments the charge timer in a block 415 and then the block 395 is executed next.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system comprising a computer, the computer being programmed to control charging of a battery, to the computer including programming to:
   determine that the battery requires charging;
   apply a charge current to the battery upon determining that the battery requires charging;
   receive data from a battery monitor sensor indicating whether the charge current is within an acceptable range;
   determine whether the charge current exceeds a temperature-dependent upper current set-point;
   determine whether a charge timer is expired; and
   terminate the charge current upon determining that the charge current exceeds the temperature-dependent upper current set-point and that the charge timer has expired.

2. The system of claim 1, wherein the computer starts a second charge timer after the charge current terminates.

3. The system of claim 2, wherein, after starting the second charge timer, the computer is further programmed to:
   determine that the battery requires charging;
   apply a charge current to the battery upon determining that the battery requires charging;
   receive data from a battery monitor sensor indicating whether the charge current is within an acceptable range;
   determine whether the charge current exceeds a temperature-dependent upper current set-point;
   determine whether the second charge timer is expired; and
   terminate the charge current upon determining that the charge current exceeds the temperature-dependent upper current set-point and that the second charge timer has expired.

4. The system of claim 1, wherein the computer is further programmed to determine that the system is in a value charge mode, determine that a status request was received as a result of determining that the system is in a value charge mode, and to apply a charge current to the battery as a result of determining that the status request was received.

5. The system of claim 1, wherein the computer is further programmed to determine that the system is not connected to a power grid, determine that the battery requires charging as a result of determining that the system is not connected to the power grid, and apply a charge current to the battery as a result of determining that the battery requires charging.

6. The system of claim 1, wherein the battery is a flooded lead acid (FLA) battery.

7. The system of claim 1, wherein the temperature-dependent upper current set-point is decreased as the temperature of the battery is increased.

* * * * *